United States Patent [19]
Boesch

[11] 3,917,849
[45] Nov. 4, 1975

[54] INSECTICIDAL AND ACARICIDAL PHENYLHYDRAZONE DERIVATIVES
[75] Inventor: Roger Boesch, Vitry-sur-Seine, France
[73] Assignee: Rhone-Poulenc, S.A., Paris, France
[22] Filed: Apr. 25, 1974
[21] Appl. No.: 464,212

Related U.S. Application Data
[62] Division of Ser. No. 363,652, May 24, 1973, Pat. No. 3,839,445.

[30] Foreign Application Priority Data
May 26, 1972 France .............................. 72.18895
Mar. 19, 1973 France .............................. 73.09753

[52] U.S. Cl. ................................ 424/327; 424/304
[51] Int. Cl.² ...................... A01N 9/20; A01N 9/24
[58] Field of Search .................. 424/327; 260/566 B

[56] References Cited
UNITED STATES PATENTS
3,150,151  9/1964  Urbschat et al. ................ 260/326.5
3,636,112  1/1972  Draber et al. .................... 260/566 B
3,786,131  1/1974  Buchel et al. ....................... 424/304
3,809,675  5/1974  Hansen ......................... 260/45.9 R OTHER PUBLICATIONS
Chemistry of Organic Compounds (Textbook) Noller, p. 234, 3rd ed., (1965)

Primary Examiner—Albert T. Meyers
Assistant Examiner—Leonard Schenkman
Attorney, Agent, or Firm—Stevens, Davis, Miller & Mosher

[57] ABSTRACT
Phenylhydrazone derivatives of the formula:

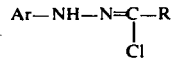

wherein R represents alkyl of 1 to 10 carbon atoms and Ar represents phenyl substituted by three atoms or radicals selected from halogen, alkyl or 1 to 4 carbon atoms, alkoxy of 1 to 4 carbon atoms, alkenyloxy of 2 to 4 carbon atoms and alkynyloxy of 2 to 4 carbon atoms, at least one of the substituents on the phenyl radical being an alkoxy, alkenyloxy or alkynyloxy radical, which are new compounds, possess insecticidal and acaricidal properties.

21 Claims, No Drawings

INSECTICIDAL AND ACARICIDAL PHENYLHYDRAZONE DERIVATIVES

This is a division of application Ser. No. 363,652, filed May 24, 1973, now U.S. Pat. No. 3,839,445.

This invention relates to new phenylhydrazone derivatives, to a process for their preparation and to compositions containing them.

The phenylhydrazone derivatives of the present invention are those of the general formula:

$$\text{Ar}-\text{NH}-\text{N}=\underset{\underset{\text{Cl}}{|}}{\text{C}}-\text{R} \qquad \text{I}$$

wherein R represents an alkyl radical containing 1 to 10 carbon atoms, and Ar represents a phenyl radical substituted by three atoms or radicals, which may be the same or different, selected from halogen (preferably chlorine) atoms, alkyl radicals containing 1 to 4 carbon atoms, alkoxy radicals containing 1 to 4 carbon atoms, alkenyloxy radicals containing 2 to 4 carbon atoms and alkynyloxy radicals containing 2 to 4 carbon atoms, at least one of the substituents on the phenyl radical being an alkoxy, alkenyloxy or alkynyloxy radical. It is to be understood that alkyl radicals represented by symbol R, and alkyl, alkoxy, alkenyloxy and alkynyloxy radicals present on the phenyl radical Ar may have straight- or branched-carbon chains.

According to a feature of the invention, the phenylhydrazone derivatives of general formula I are prepared by the action of a chlorinating agent, such as phosphorus pentachloride, phosphorus oxychloride or thionyl chloride, on a phenylhydrazide of the general formula:

$$\text{Ar}-\text{NH}-\text{NH}-\text{CO}-\text{R} \qquad \text{II}$$

wherein R and Ar are as hereinbefore defined.

Preferably phosphorus pentachloride is used as the chlorinating agent and the reaction can then be represented schematically in the following manner:

1) $\text{Ar}-\text{NH}-\text{NH}-\text{CO}-\text{R} + \text{PCl}_5 \rightarrow \text{Ar}-\underset{\underset{\text{POCl}_2}{|}}{\text{N}}-\text{N}=\underset{\underset{\text{Cl}}{|}}{\text{C}}-\text{R} + 2\text{HCl}$ 2) $\text{Ar}-\underset{\underset{\text{Cl}_2\text{OP}}{|}}{\text{N}}-\text{N}=\underset{\underset{\text{Cl}}{|}}{\text{C}}-\text{R} + 3\text{Ar}_1\text{OH} \rightarrow \text{Ar}-\text{NH}-\text{N}=\underset{\underset{\text{Cl}}{|}}{\text{C}}-\text{R} + (\text{Ar}_1\text{O})_3\text{PO} + 2\text{HCl}$ wherein the symbols R and Ar are as hereinbefore defined, and Ar$_1$ represents a phenyl radical which is optionally substituted, for example by an alkyl radical.

Conversion of the grouping —NH—CO—R in the phenylhydrazides of general formula II into a grouping $$-\text{N}=\underset{\underset{\text{Cl}}{|}}{\text{C}}-\text{R}$$

is generally effected by heating the phenylhydrazide of general formula II and phosphorus pentachloride in an inert organic solvent such as carbon tetrachloride or ethyl acetate, preferably at the reflux temperature of the solvent employed, e.g. about 80°C. Decomposition of the phosphorylated complex obtained can be effected by heating with a phenol in the same inert organic solvent.

When thionyl chloride is employed as the chlorinating agent the reaction can be represented schematically as follows:

$$\text{Ar}-\text{NH}-\text{NH}-\text{CO}-\text{R} + \text{SOCl}_2 \rightarrow \text{Ar}-\text{NH}-\text{N}=\underset{\underset{\text{Cl}}{|}}{\text{C}}-\text{R} + \text{SO}_2 + \text{HCl}$$

wherein R and Ar are as hereinbefore defined. Generally the reaction is effected by heating the reactants in an inert organic solvent such as carbon tetrachloride preferably at the reflux temperature of the solvent employed, e.g. about 80°C.

The phenylhydrazides of general formula II can be obtained by the action of an acid of the general formula:

$$\text{R}-\text{COOH} \qquad \text{III}$$

(wherein R is as hereinbefore defined), or a derivative of the acid, such as a halide or the anhydride, on a phenylhydrazine of the general formula:

$$\text{Ar}-\text{NH}-\text{NH}_2 \qquad \text{IV}$$

wherein Ar is as hereinbefore defined. The reaction is generally carried out in an inert organic solvent such as methylene chloride, ethyl acetate or an aromatic hydrocarbon such as benzene.

The phenylhydrazines of general formula IV can be obtained by diazotization of an aniline of the general formula $$\text{Ar}-\text{NH}_2 \qquad \text{V}$$

(wherein Ar is as hereinbefore defined) and reduction of the resulting diazonium salt.

The phenylhydrazone derivatives of general formula I obtained by the afore-described process can optionally be purified by application of physical methods such as crystallisation or chromatography.

The new compounds of general formula I possess particularly interesting insecticidal and acaricidal properties. The insecticidal activity is manifest more particularly by contact against diptera (*Musca domestica*), coleoptera (*Tribolium confusum*) and lepidoptera (*Plutella maculipennis* caterpillars) at doses between 10 and 100 g. of active material per hectoliter of liquid diluent. The acaricidal activity is interesting against phytophagous acarids (*Tetranychus telarius*) at doses between 1 and 100 g. of active material per hectoliter of liquid diluent. At doses between 1 and 200 g. of active material per hectoliter of liquid diluent, the phenylhydrazone derivatives of general formula I show a considerable ovidical activity.

Of particular interest are those phenylhydrazone derivatives of general formula I in which the three substituents on the phenyl nucleus are in positions 2-, 4- and 5- and which can be represented by the general formula:

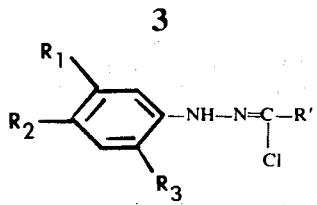

wherein R' represents an alkyl radical containing 1 to 4 carbon atoms, $R_1$ represents a halogen atom or an alkoxy radical containing 1 to 4 carbon atoms, or an alkenyloxy or alkynyloxy radical containing 2 to 4 carbon atoms, $R_2$ represents a halogen atom, or an alkyl or alkoxy radical containing 1 to 4 carbon atoms, or an alkenyloxy or alkynyloxy radical containing 2 to 4 carbon atoms, one of the symbols $R_1$ and $R_2$ representing an alkoxy, alkenyloxy or alkynyloxy radical, and $R_3$ represents a halogen atom, preferably chlorine. When one of the symbols $R_1$ and $R_2$ represents a halogen atom, the atom is preferably chlorine.

Compounds of general formula VI of outstanding importance are those in which R' represents the methyl, ethyl, propyl, isopropyl, isobutyl or t.-butyl radical, $R_1$ represents an isopropoxy, allyloxy or propargyloxy radical, and $R_2$ and $R_3$ represent chlorine atoms, for example 1-(2,4-dichloro-5-propargyloxyphenyl-hydrazono)-1-chloro-2-methylpropane,
1-(2,4-dichloro-5-propargyloxyphenyl-hydrazono)-1-chloro-2,2-dimethylpropane,
1-(2,4-dichloro-5-propargyloxyphenyl-hydrazono)-1-chloroethane,
1-(2,4-dichloro-5-isopropoxyphenyl-hydrazono)-1-chloro-2-methylpropane,
1-(2,4-dichloro-5-propargyloxyphenyl-hydrazono)-1-chloropropane,
1-(2,4-dichloro-5-propargyloxyphenyl-hydrazono)-1-chloro-3-methylbutane,
1-(2,4-dichloro-5-isopropoxyphenyl-hydrazono)-1-chlorobutane,
1-(2,4-dichloro-5-isopropoxyphenyl-hydrazono)-1-chloro-3-methylbutane,
1-(2,4-dichloro-5-propargyloxyphenyl-hydrazono)-1-chlorobutane,
1-(2,4-dichloro-5-isopropoxyphenyl-hydrazono)-1-chloro-2,2-dimethylpropane,
1-(2,4-dichloro-5-allyloxyphenyl-hydrazono)-1-chloro-2,2-dimethylpropane,
1-(2,4-dichloro-5-allyloxyphenyl-hydrazono)-1-chloroethane and
1-(2,4-dichloro-5-isopropoxyphenyl-hydrazono)-1-chloropropane, especially the first-mentioned compound.

According to a further feature of the present invention, there are provided insecticidal and acaricidal compositions which contain, as the active ingredient, at least one of the phenylhydrazone derivatives of general formula I in association with one or more diluents or adjuvants compatible with the phenylhydrazone derivative(s) and suitable for use in agriculture.

These compositions can optionally contain other compatible pesticides such as fungicides (e.g. maneb). Preferably the compositions contain between 0.005% and 80% by weight of phenylhydrazone derivative.

The compositions may be solid if there is employed a powdered solid compatible diluent such as talc, calcined magnesia, kieselguhr, tricalcium phosphate, powdered cork, adsorbent charcoal, or a clay such as kaolin or bentonite. These solid compositions are preferably prepared by grinding the phenylhydrazone derivative with the solid diluent, or by impregnating the solid diluent with a solution of the phenylhydrazone derivative in a volatile solvent, evaporating the solvent, and if necessary grinding the product so as to obtain a powder.

Instead of a solid diluent, there may be used a liquid in which the phenylhydrazone derivative is dissolved or dispersed. The compositions may thus take the form of suspensions, emulsions or solutions in organic or aqueous-organic media, for example aromatic hydrocarbons such as toluene or xylene, mineral, animal or vegetable oils, or acetophenone, or mixtures of these diluents. The compositions in the form of suspensions, emulsions or solutions may contain wetting, dispersing or emulsifying agents of the ionic or non-ionic type, for example sulphoricinoleates, quaternary ammonium derivatives or products based on condensates of ethylene oxide such as the condensates of ethylene oxide with octylphenol, or fatty acid esters of anhydrosorbitols which have been rendered soluble by etherification of the free hydroxyl groups by condensation with ethylene oxides. It is preferable to use agents of the non-ionic type because they are not sensitive to electrolytes. When emulsions are required the phenylhydrazone derivatives may be used in the form of self-emulsifying concentrates containing the active substance dissolved in the emulsifying agent or in a solvent containing an emulsifying agent compatible with the phenylhydrazone derivative and solvent, a simple addition of water to such concentrates producing compositions ready for use.

The phenylhydrazone derivatives of general formula I are preferably employed for insecticidal and acaricidal purposes in quantities of 10 to 100 g. per hectoliter of water, but lower concentrations can also be used effectively.

The following Example illustrates the preparation of phenylhydrazone derivatives of general formula I.

EXAMPLE 1

A suspension of 1-isobutyryl-2-(2,4-dichloro-5-propargyloxyphenyl)hydrazine (30.1 g.) and phosphorus pentachloride (21.5 g.) in carbon tetrachloride (200 cc.) is heated under reflux until the evolution of gas ceases. To the solution obtained there is added, after cooling to 20°C., phenol (32.4 g.) dissolved in carbon tetrachloride (115 cc.) and the mixture is then heated until the evolution of gas ceases whilst taking the reaction mixture progressively to the reflux temperature. The solvent is evaporated under reduced pressure (20 mm Hg) at 50°C and the residual solid is stirred with di-isopropyl ether (100 cc.). The crystals which are formed are filtered off, washed with di-isopropyl ether cooled to 5°C. (2 × 10 cc.) and dried under reduced pressure (0.5 mm Hg) at 20°C to yield 1-(2,4-dichloro-5-propargyloxyphenyl-hydrazono)-1-chloro-2-methylpropane (23 g.) melting at 103°C.

1-Isobutyryl-2-(2,4-dichloro-5-propargyloxyphenyl)-hydrazine (m.p. 162° and then 169°C.), which is employed as starting material, can be obtained by the action of isobutyryl chloride on 2,4-dichloro-5-propargyloxyphenyl-hydrazine in ethyl acetate in the presence of triethylamine.

2,4-Dichloro-5-propargyloxyphenyl-hydrazine, m.p. 132°C., can be obtained by the action of sodium nitrite on 2,4-dichloro-5-propargyloxy-aniline in hydrochloric acid (d = 1.18) followed by reduction of the diazonium salt thus formed with stannous chloride.

2,4-Dichloro-5-propargyloxy-aniline, m.p. 90°C., can be prepared by the reduction of the corresponding nitro derivative by means of iron in aqueous ethanol.

2,4-Dichloro-5-propargyloxy-nitrobenzene, m.p. 66°C., can be prepared by the action of propargyl chloride on 2,4-dichloro-5-nitrophenol in acetonitrile under reflux in the presence of potassium carbonate.

By proceeding as described in the foregoing Example and starting with appropriate phenylhydrazides of general formula II, there can be prepared the following phenylhydrazone derivatives conforming to general formula I:

1-(2,4-dichloro-5-propargyloxyphenyl-hydrazono)-1-chloro-2,2-dimethylpropane, m.p. 67°, then 77°C;

1-(2,4-dichloro-5-propargyloxyphenyl-hydrazono)-1-chloroethane, m.p. 143°C.;

1-(2,4-dichloro-5-isopropoxyphenyl-hydrazono)-1-chloro-2-methylpropane, solidification point 38°C.;

1-(2,4-dichloro-5-propargyloxyphenyl-hydrazono)-1-chloropropane, m.p. 100°C.;

1-(2,4-dichloro-5-propargyloxyphenyl-hydrazono)-1-chloro-3-methylbutane, an oil;

1-(2,4-dichloro-5-isopropoxyphenyl-hydrazono)-1-chlorobutane, an oil;

1-(2,4-dichloro-5-isopropoxyphenyl-hydrazono)-1-chloroheptane, an oil;

1-(2,4-dichloro-5-isopropoxyphenyl-hydrazono)-1-chlorooctane, an oil;

1-(2,4-dichloro-5-isopropoxyphenyl-hydrazono)-1-chloro-3-methylbutane, an oil;

1-(2,4-dichloro-5-propargyloxyphenyl-hydrazono)-1-chlorobutane, an oil;

1-(2,4-dichloro-5-isopropoxyphenyl-hydrazono)-1-chloro-2,2-dimethylpropane, solidification point 34°C.;

1-(2,4-dichloro-5-methoxyphenyl-hydrazono)-1-chloropropane, m.p. 70°-71°C.;

1-(2,4-dichloro-5-methoxyphenyl-hydrazono)-1-chloro-2,2-dimethylpropane, m.p. 118°-119°C.;

1-(2,4-dichloro-5-allyloxyphenyl-hydrazono)-1-chloro-2,2-dimethylpropane, m.p. 87°C.;

1-(2,4-dichloro-5-methoxyphenyl-hydrazono)-1-chlorobutane, m.p. 70°C.;

1-(2,4-dichloro-5-allyloxyphenyl-hydrazono)-1-chloroethane, m.p. 87°C.;

1-(2,4-dichloro-5-isopropoxyphenyl-hydrazono)-1-chloropropane, solidification point 27°C.;

1-(2,4-dichloro-5-sec-butoxyphenyl-hydrazono)-1-chloroethane, m.p. 47°C.;

1-(2,4-dichloro-5-sec-butoxyphenyl-hydrazono)-1-chloropropane, solidification point 27°C.;

1-(2,4-dichloro-5-sec-butoxyphenyl-hydrazono)-1-chlorobutane, solidification point 29°C.;

1-(2,4-dichloro-5-sec-butoxyphenyl-hydrazono)-1-chloro-2-methypropane, an oil;

1-(2,4-dichloro-5-ethoxyphenyl-hydrazono)-1-chloropropane, m.p. 64°, then 67°C.;

1-(2,4-dichloro-5-ethoxyphenyl-hydrazono)-1-chlorobutane, m.p. 77°C.;

1-(2,4-dichloro-5-ethoxyphenyl-hydrazono)-1-chloro-2-methylpropane, m.p. 68°C.;

1-(2,4-dichloro-5-ethoxyphenyl-hydrazono)-1-chloro-2,2-dimethylpropane, m.p. 121°C.;

1-(2,5-dichloro-4-propargyloxyphenyl-hydrazono)-1-chloro-2,2-dimethylpropane, m.p. 71°C.;

1-(2-chloro-4-methyl-5-propargyloxyphenyl-hydrazono)-1-chlorobutane, m.p. 57°C.;

1-(2,5-dichloro-4-propargyloxyphenyl-hydrazono)-1-chloro-2-methylpropane, m.p. 94°C.;

1-(2-chloro-4-methyl-5-propargyloxyphenyl-hydrazono)-1-chloropropane, m.p. 74°C.;

1-(2-chloro-4-methyl-5-propargyloxyphenyl-hydrazono)-1-chloroethane, m.p. 90°C.;

1-(2,5-dichloro-4-propargyloxyphenyl-hydrazono)-1-chloroethane, m.p. 103°C.;

1-(2,5-dichloro-4-propargyloxyphenyl-hydrazono)-1-chloropropane, m.p. 87°C., and 1-(2,5-dichloro-4-propargyloxyphenyl-hydrazono)-1-chlorobutane, solidification point 38°C.

The products obtained as oils are characterised by elementary analysis and infra-red spectra.

EXAMPLE 2

5 g. of a condensation product of octylphenol and ethylene oxide containing 10 molecules of ethylene oxide per molecule of octyphenol are added to 20 g. of 1-(2,4-dichloro-5-propargyloxyphenyl-hydrazono)-1-chloro-2-methylpropane, and a mixture of equal volumes of toluene and acetophenone are added until the mixture reaches 100 cc.

The solution thus obtained is used after suitable dilution with water to destroy acarids.

According to the effect required concentrations of 1 to 100 g. of phenylhydrazone derivative per hectoliter of water give good results.

EXAMPLE 3

To 50 parts of 1-(2,4-dichloro-5-propargyloxyphenyl-hydrazono)-1-chloro-2-methylpropane there are added 1 part of Tween 80 (the mono-oleate of a polyoxyethylene derivative of sorbitol), 20 parts of calcium lignosulphite and 29 parts of kieselguhr. After grinding and sieving, the powder obtained is utilised after dilution with water to destroy acarids.

The parts referred to above are parts by weight.

I claim:

1. An insecticidal and acaricidal composition which contains, as the active ingredient, a phenylhydrazone derivative of the formula:

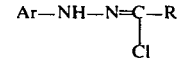

wherein R represents alkyl of 1 through 10 carbon atoms and Ar represents phenyl substituted by three substituents which may be the same or different and are selected from the group consisting of halogen, alkyl of 1 through 4 carbon atoms, alkoxy of 1 through 4 carbon atoms, alkenyloxy of 2 through 4 carbon atoms and alkynyloxy of 2 through 4 carbon atoms, at least one of the substituents on the phenyl radical being an alkoxy, alkenyloxy or alkynyloxy radical, in association with one or more diluents or adjuvants compatible with the phenylhydrazone derivative and suitable for use in agricultural insecticidal and acaricidal compositions, the quantity of phenylhydrazone derivative in the composition being 0.005 to 80% by weight of the composition.

2. A composition according to claim 1 in which the diluent is water and the composition contains 10 to 100 g. of phenylhydrazone derivative per hectoliter of water.

3. A composition according to claim 1 which contains a wetting agent.

4. A composition according to claim 3 in which the wetting agent is a non-ionic compound.

5. A composition according to claim 1 wherein one or more halogen substituent on the phenyl radical is chlorine.

6. A composition according to claim 1 wherein the phenylhydrazone derivative is 1-(2,4-dichloro-5-propargyloxyphenyl-hydrazono)-1-chloro-2-methylpropane.

7. A composition according to claim 1 wherein the phenylhydrazone derivative is 1-(2,4-dichloro-5-propargyloxyphenyl-hydrazono)-1-chloro-2,2-dimethylpropane.

8. A composition according to claim 1 wherein the phenylhydrazone derivative is 1-(2,4-dichloro-5-propargyloxyphenyl-hydrazono)-1-chloroethane.

9. A composition according to claim 1 wherein the phenylhydrazone derivative is 1-(2,4-dichloro-5-isopropoxyphenyl-hydrazono)-1-chloro-2-methylpropane.

10. A composition according to claim 1 wherein the phenylhydrazone derivative is 1-(2,4-dichloro-5-propargyloxyphenyl-hydrazono)-1-chloropropane.

11. A composition according to claim 1 wherein the phenylhydrazone derivative is 1-(2,4-dichloro-5-propargyloxyphenyl-hydrazono)-1-chloro-3-methylbutane.

12. A composition according to claim 1 wherein the phenylhydrazone derivative is 1-(2,4-dichloro-5-isopropoxyphenyl-hydrazono)-1-chlorobutane.

13. A composition according to claim 1 wherein the phenylhydrazone derivative is 1-(2,4-dichloro-5-isopropoxyphenyl-hydrazono)-1-chloro-3-methylbutane.

14. A composition according to claim 1 wherein the phenylhydrazone derivative is 1-(2,4-dichloro-5-propargyloxyphenyl-hydrazono)-1-chlorobutane.

15. A composition according to claim 1 wherein the phenylhydrazone derivative is 1-(2,4-dichloro-5-isopropoxyphenyl-hydrazono)-1-chloro-2,2-dimethylpropane.

16. A composition according to claim 1 wherein the phenylhydrazone derivative is 1-(2,4-dichloro-5-allyloxyphenyl-hydrazono)-1-chloro-2,2-dimethylpropane.

17. A composition according to claim 1 wherein the phenylhydrazone derivative is 1-(2,4-dichloro-5-allyloxyphenyl-hydrazono)-1-chloroethane.

18. A composition according to claim 1 wherein the phenylhydrazone derivative is 1-(2,4-dichloro-5-isopropoxyphenyl-hydrazono)-1-chloropropane.

19. A composition according to claim 1 wherein the phenylhydrazone derivative has the formula:

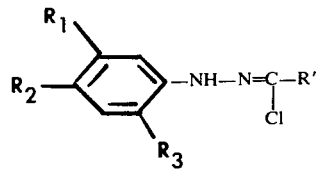

wherein R' represents alkyl of 1 through 4 carbon atoms, $R_1$ represents halogen, alkoxy of 1 through 4 carbon atoms, or alkenyloxy or alkynyloxy of 2 through 4 carbon atoms, $R_2$ represents halogen, alkyl or alkoxy of 1 through 4 carbon atoms, or alkenyloxy or alkynyloxy of 2 through 4 carbon atoms, one of the symbols $R_1$ and $R_2$ represents alkoxy, alkenyloxy or alkynyloxy, and $R_3$ represents halogen.

20. A composition according to claim 19 wherein one of the symbols $R_1$ and $R_2$ represents chlorine and the other represents alkoxy, alkenyloxy or alkynyloxy, and $R_3$ represents chlorine.

21. A composition according to claim 19 in which R' represents methyl, ethyl, propyl, isopropyl, isobutyl or t.-butyl, $R_1$ represents isopropoxy, allyloxy or propargyloxy, and $R_2$ and $R_3$ represent chlorine.

* * * * *